Aug. 23, 1932.　　　　P. FRENELL　　　　1,873,193
SYSTEM FOR RECIPROCATING ELECTRIC MOTORS
Filed April 7, 1928　　　4 Sheets-Sheet 1

Inventor:
Per Frenell,
By
Langner, Parry, Card & Langner
Attys.

Aug. 23, 1932.   P. FRENELL   1,873,193
SYSTEM FOR RECIPROCATING ELECTRIC MOTORS
Filed April 7, 1928   4 Sheets-Sheet 2
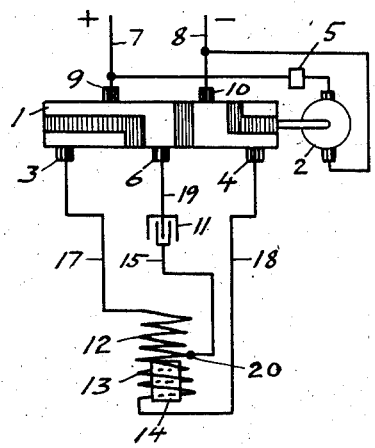
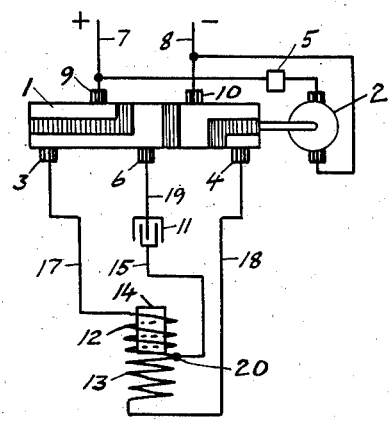
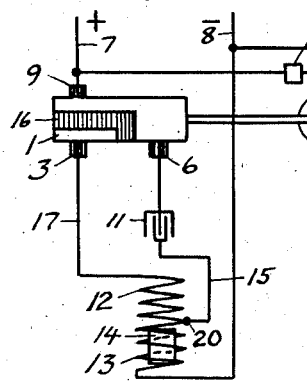
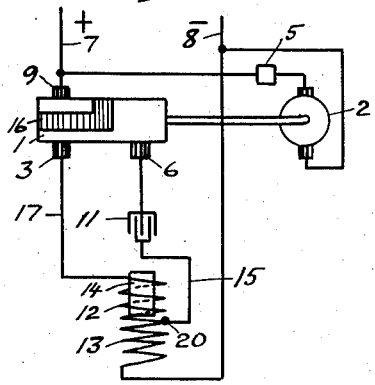

Inventor:
Per Frenell

Patented Aug. 23, 1932

1,873,193

UNITED STATES PATENT OFFICE

PER FRENELL, OF GOTTENBORG, SWEDEN

SYSTEM FOR RECIPROCATING ELECTRIC MOTORS

Application filed April 7, 1928, Serial No. 268,265, and in Sweden December 24, 1926.

This invention relates to electric motors with reciprocating piston for driving working machines, such as pumps, compressors, vibrating tools, drills for stone and other material, chisels, riveters, hammers, and so on. The invention particularly relates to motors provided with one or more magnet coils, in the magnetic field of which the piston of the motor is moved to and fro under the influence of an electric current pulsating in the coils.

For obtaining this pulsating magnetic field the waves of an alternating current have previously been utilized in different ways. As the number of strokes or blows of such motors however is dependent on the frequency of the alternating current and a motor for alternating current of for instance a frequency of 50 works with not less than 3,000 strokes or blows per minute, the use of such motors is not always possible or desirable as the number of strokes or blows must be different for different applications. Any suitable speed, which can be varied as wanted, can be obtained in a motor according to this invention when using a direct current supply.

This invention is founded upon the fact that a circuit containing reactance, capacity and resistance and being connected to a direct current source generates an alternating current of decreasing amplitude. The frequency of this alternating current is depending upon the magnitude of said quantities. If, for instance, the capacity in the circuit becomes smaller or larger, the frequency will become higher or lower approximately in an inverse proportion to the square-root of the capacity at small resistance in the circuit. The same is the case if the reactance is altered. When increasing the resistance the frequency becomes lower and vice versa.

When the current wave in such a circuit passes the zero point the first time, the impressed voltage upon the condenser has reached its maximum value, and the condenser has become charged with an amount of energy proportional to $C \times E^2$, where C represents the capacity and E the voltage of the condenser. In order to utilize this energy the condenser is either alternately connected in different circuits with a simultaneous changing of polarity from the source of energy, or the condenser will be periodically connected in different circuits, one of which thereby being alternately opened and short circuited and the other simultaneously alternately connected to and disconnected from the source of energy. In the first mentioned case the source of energy is twice the time as in the second case. The condenser will in the first case be charged and discharged twice during each working period, in the second case only once. For the same reactance and resistance in the circuit the size of the condenser will in the latter case be larger than in the former.

The accompanying drawings illustrate diagrammatically a few embodiments of the invention, in which:—

Figs. 5 and 6 show a third embodiment with two coils.

Figs. 7 and 8 show a fourth embodiment with two coils.

The same reference numerals are used in the different diagrams for the same or equivalent parts.

Figure 1:
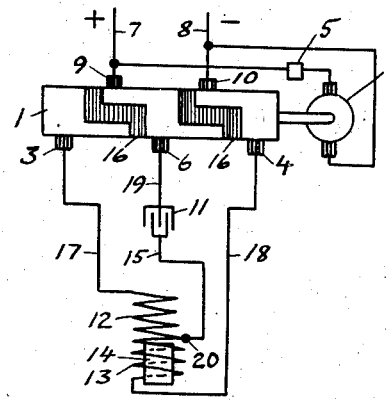
Fig. 1 shows a diagram with two coils for excitation of the magnetic field, and Fig. 2 the same with the reverse position of the commutator.

A commutator 1 is driven by an electric motor 2 connected by means of wires 7 and 8 to an electric source indicated by + and −. A rheostat 5 is connected in the motor circuit to adjust the speed of the motor 2. The wires 7 and 8 are also connected to the commutator 1 over sliding contacts or brushes 9 and 10 respectively. The commutator has a cylindrical form and consists in a known manner of different electrically conducting parts isolated from each other by insulation 16. The piston reciprocating in the magnetic field is indicated by 14 and the condenser by 11.

Figure 2:
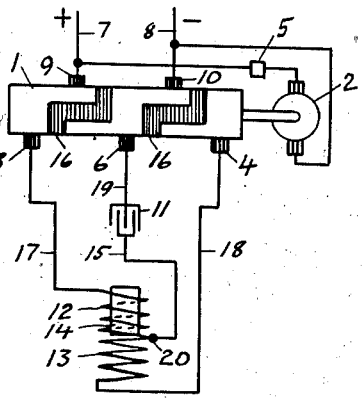

In Figs. 1 and 2 the two magnet coils 12, 13 are connected to the communtator over sliding contacts or brushes 3, 6 and 4 in such way that one end of each coil is connected at 20 to a wire 15 and one side of the condenser 11, while the other side of the condenser is connected to the contact 6 over a wire 19. The other ends of the coils 12, 13 are connected to the contacts 3, 4 over wires 17, 18 respectively. When the device is in operation the condenser 11 is charged and discharged during the rotation of the commutator 1 which alternately connects and disconnects the coils 12, 13 to the wires 7, 8 of the electric supply. In Fig. 1 the electric direct current flows in the following circuit: +, 7, 9, 1, 6, 19, 11, 15, 20, *13*, 18, 4, 1, 10, 8, −, whereby the coil 13 is excited and attracts the piston 14, which is built as a magnetic core and now exerts a blow or stroke downwards in the figure. It is assumed that the motor is about to be started, i. e. that the circuit is just closed, and that the condenser 11 is discharged. At the abovementioned first closing of the circuit there is performed substantially only a charging of the condenser 11 in a certain direction. When the commutator 1 then takes up the position shown in Fig. 2, in which the current flows in the circuit +, 7, 9, 1, 3, 17, *12*, 20, 15, 11, 19, 6, 1, 10, the condenser 11 and the conductors directly connected thereto will be passed by the current in the opposite direction. Hereby the energy stored in the condenser during the foregoing period will first be discharged and thereupon the condenser will immediately be charged in the opposite direction. At the reversal of the current direction in the condenser and the conductors connected thereto then brought about by the commutator there will first, as at the foregoing period be performed a discharge and then a charge in the opposite direction of the condenser, the piston 14 being thrown downwards when the coil 13 is excited and upwards when the coil 12 is excited. This is repeated and the piston will be thrown alternately forth and back in the known manner thereby delivering work. The number of strokes delivered per minute is, as stated above, depending upon the capacity of the condenser 11, the reactance of the coils and the resistance of the circuit. Therefore the speed of the motor 2 with commutator 1 must be calculated to correspond to said number of strokes. A small adjustment of the speed can be obtained by means of the rheostat 5. The number of strokes or blows can be varied within wide limits of the condenser 11 is made adjustable so that the capactiy is altered and thereby the frequency. The most prominent advantage is however not that a speed regulation can take place in the motor or tool, but that the piston motor can be built for a speed which is most efficient and best suitable for each kind of application.

Figure 3:
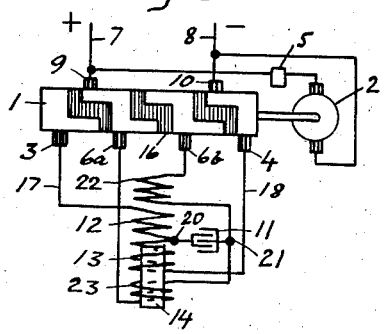
Figs. 3 and 4 show similar diagrams of a second embodiment with four coils.
Figure 4:
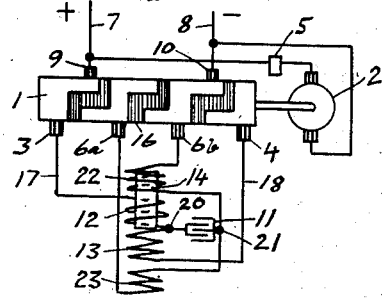

In Figs. 3 and 4 four coils 12, 13, 22, 23 are provided and the communtator is therefore divided in four parts and provided with four sliding contacts for the coil wires 3, 6a, 6b, 4. The coils cooperate in pairs in the following circuits. In Fig. 3 this circuit is closed: +, 7, 9, 1, 6a, *23*, 21 (point of connection between the coils 22, 23), 11, 20, *13*, 18, 4, 1, 10, 8, −, whereby the coils 23 and 13 become energized and attract the piston 14. In Fig. 4 the following circuit is closed, since the commutator 1 has revolved 180°: +, 7, 9, 1, 3, 17, *12*, 20 11, 21, *22*, 6b, 1, 10, 8, −, and the coils 12 and 22 thereby attract the piston 14.

In Figs. 5 and 6 the same wiring is shown as in Figs. 1 and 2. The commutator 1 is different in that respect that the coil 12 never becomes connected to the electric source but only short circuited in the following circuit according to Fig. 6: 11, 19, 6, 1, 3, 17, *12*, 20, 15, 11, whereby the core 14 is thrown upwards. When the commutator 1 has revolved 180° the said circuit is again opened and the following circuit in Fig. 5 closed: +, 7, 9, 1, 6, 19, 11, 15, 20, *13*, 18, 4, 1, 10, 8, −, thereby throwing the core 14 downward again. If it is desired, as in hammers, to make the return or recoil stroke of the piston less powerful than the forward stroke, this is accomplished for instance by making the resistance in the first named circuit larger than in the other circuit.

The embodiment shown in Figs. 7 and 8 is principally the same as that in Figs. 1 and 2, the only difference being that the commutator is designed for a reduced number of brushes. In Figs. 1 and 2 five brushes are used for transmitting the electric current, in Figs. 7 and 8 only three of them are used. The commutator is thereby essentially simplified and the maintenance cost of the device will be less. In Fig. 7 the charging circuit for the condenser is the following: +, 7, 9, 1, 6, 11, 15, 20, *13*, 8, −. In Fig. 8 the discharging circuit is: 11, 6, 1, 3, 17 *12*, 20, 15, 11.

Figure 9:
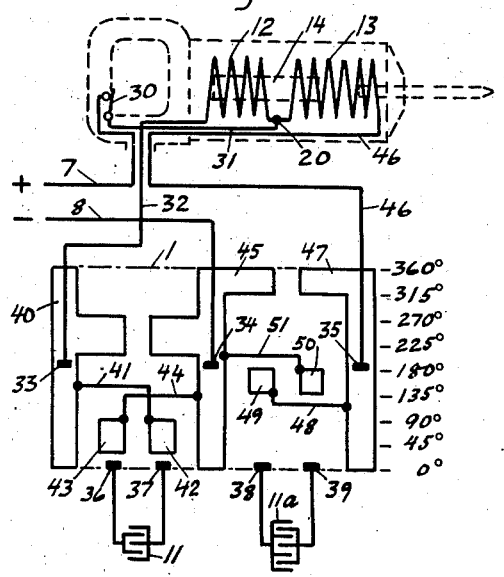
Fig. 9 shows an embodiment similar to Figs. 1 and 2 but with two condensers.

If desired to obtain a weaker return blow or recoil the embodiment of Figs. 1 and 2 could be applied making the magnetcoil for the upward or return blow smaller than the other coil. In this case however a separate condenser must be used for each coil as shown in Fig. 9. In this diagram two condensers 11 and 11a are provided, and the commutator 1 is shown developed and provided with contact segments 40, 42, 43, 45, 47, 49 and 50, also with brushes 33, 34, 35 on one side of the commutator and brushes 36, 37, 38, 39 on the opposite side. If the commutator as shown is rotated downwards one revolution from 0° to 360° while the brushes are kept stationary four circuits will be established successively and the circuits will be opened in the positions marked 0°, 90°, 180° and 270°. In the position 45° the following circuit is closed:

+, 7, 30, 31, 20, *12*, 32, 33, 40, 41, 42, 37, 11, 36, 43, 44, 45, 34, 8, −, and the core 14 is moved to the left by the action of the coil 12. In the position 135° the following circuit is closed: +, 7, 30, 31, 20, *13*, 46, 35, 47, 48, 49, 38, 11a, 39, 50, 51, 45, 34, 8, −, and the core 14 thrown to the right under the influence of the coil 13. In the position 225° the following circuit is closed: +, 7, 30, 31, 20, *12*, 32, 33, 40, 36, 11, 37, 45, 34, 8, −, and the core 14 is again moved to the left under the influence of the coil 12 which is smaller than the coil 13 and therefore exerts a weaker pulling power upon the core. In the position 315° the following circuit is closed: +, 7, 30, 31, 20, *13*, 46, 35, 47, 39, 11a, 38, 45, 34, 8, −, and the core 14 is again rapidly moving to the right to exert a hard blow upon the tool. Thus two impulses are given to each coil 12 and 13 during one revolution of the commutator. As visible from Fig. 9 the tool including the core 14 and the coils 12 and 13 forms one aggregate, and the motor, commutator 1 and condensers 11 and 11a form a second aggregate separated from the first-mentioned aggregate, the connection between said aggregates being established by the conductors 7, 32, and 46 only. By such a separating of the several parts the blow motor will be lighter, which is of importance, since said motor has to be moved from one place to another, and, besides, the more susceptible second aggregate will be protected from the shock and other disadvantageous effects occurring at the blow motor.

Figure 10:
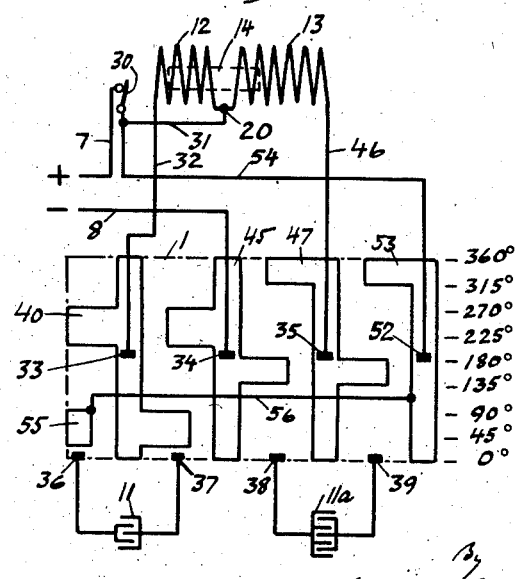
Fig. 10 shows an embodiment similar to Figs. 5 and 6 but with two condensers.

Another way to obtain a weaker recoil is to make use of the embodiment of Figs. 5 and 6 making one of the coils smaller and adding one condenser, in which case the diagram of Fig. 10 is obtained. This diagram is similar to that of Fig. 9, showing two condensers 11 and 11a and the commutator developed. Four brushes 33, 34, 35 and 52 are shown on one side of the commutator and four brushes 36, 37, 38 and 39 on the other. Four circuits will be established during one revolution of the commutator 1 from 0° to 360°. These circuits are opened in the positions 0°, 90°, 180° and 270° of the commutator. Supposing that the condenser 11 has been charged during a previous revolution of the commutator the following circuit will be established at the position 45° of the commutator: 11, 36, 55, 56, 53, 52, 54, 31, 20, *12*, 32, 33, 40, 37, 11, and the coil 12 is excited. In the position 135° the following circuit is established: +, 7, 30, 31, 20, *13*, 46, 35, 47, 39, 11a (which now will be charged), 38, 45, 34, 8, −, and the coil 13 is excited. In the position 225° the following circuit is established: +, 7, 30, 31, 20, *12*, 32, 33, 40, 36, 11, 37, 45, 34, 8, −, and the coil 12 is again energized and the condenser 11 charged from the source of energy. In the position 315° the condenser 11a will be discharged in the following circuit 11a, 39, 53, 52, 54, 31, 20, *13*, 46, 35, 47, 38, 11a, and the coil 13 is again energized. Also in this case two blows are obtained during each revolution of the commutator 1.

The commutators shown in Figs. 9 and 10 can preferably be driven by a separate motor, which is not shown here.

Figure 11:
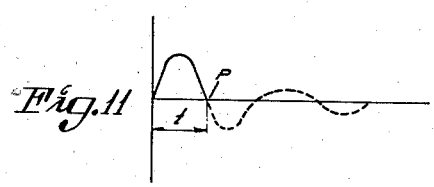
Figs. 11 to 15 show diagrams indicating the action of the condenser, as will be more clearly described below.
Figure 12:
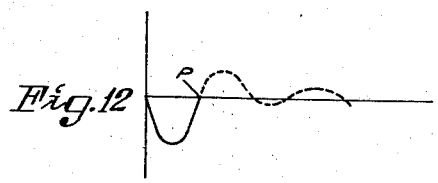
Figure 13:
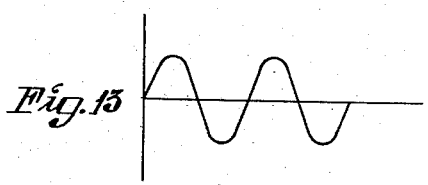
Figure 14:
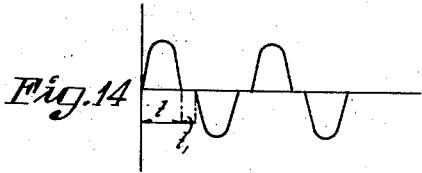
Figure 15:
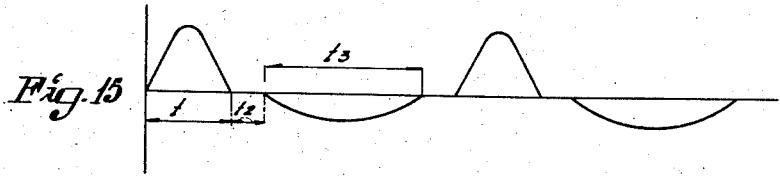

When a condenser is charged (or discharged) this occurs during a decreasing amplitude of the current, see Fig. 11. I avoid the use of more than the first half wave and the commutator must therefore open the charging circuit at P, viz. the duration of the connection in the circuit of the commutator (or periodically reversing means) is equal to the time $t$. Then follows a second connection in the circuit of the commutator, but now in the reversed direction of current during the discharging of the condenser, see Fig. 12. After the same time $t$ the circuit is again opened at P. The charging and discharging currents should thereby attain the form shown in Fig. 13. This is, however, not possible, because a certain amount of time will be lost during the reversal of the current by means of the commutator. The brushes of this commutator must be allowed to pass from one segment contact to the other and these contacts are necessarily spaced by means of insulation. On the other hand the capacity current should not be opened before its value has gone down to zero in order to avoid sparking and obtain the best efficiency. Thus there will occur a loss of time before the condenser is connected in the circuit again and the curve attains the form of Fig. 14 or of Fig. 15. Between each charge or discharge a pause $t_1$ or $t_2$ arises according to the design of the commutator. The natural frequency is given by the time $t$, the speed of the motor (or the frequency of the blows of the hammer) by the time $(t \div t_1)$ or $(t \div t_2)$. It is therefore evident that it is not quite clear to say that the capacity should be calculated for the same frequency as that of the commutator. It is better to state that the natural frequency of the circuit is substantially equal to the periodic reversal of the current, but still better to use the expression "the time for a half-period of the natural frequency of the circuit is substantially equal to the duration of the connection in the circuit of the periodic reversing means which controls the speed of the motor". It is of course, the aim to obtain the curve form of Fig. 13 but this can never be fully attained. An advantage is also gained when using the form shown in Figs. 14–15, because the frequency of the blows can be varied at will without sparking. The "time for half a period of the natural frequency" is $t$, and the "duration of the connection of the reversing means" is also $t$.

These should be equal or substantially so, varying up to about 15%. It is evident that, if the same condenser be used for both coils, and if both coils have the same induction the diagram areas at both sides of the base line will be congruent. On the other hand, if separate condensers be used, as in Figs. 9 and 10, or if, when using a common condenser, as in Figs. 1–8, the induction of the coils be made different, the said areas may differ considerably in shape as visible from Fig. 15, which shows waves having different frequencies and where thus the time $t_3$ for the waves located below the base line differs from that of the other waves, the sizes of the areas being still equal. In this case, the frequency and amplitude of the waves of the return coil may be made wholly independent of those of the waves of the blow coil.

This invention is not limited to the embodiments shown and described. Thus a greater number of coils and condensers can be used. Also the commutator can have another design or consist of a double-throw switch.

This invention is not limited to direct current supply but can also be used on alternating current, in which case the motor driving the commutator must be a synchronous motor provided wth a suitable number of poles to correspond to the number of blows desired per unit of time.

What I claim is:—

1. In a system wherein there is an electric motor comprising a reciprocating armature, a solenoid actuating said armature to move in one direction, a second solenoid actuating said armature to move in the opposite direction, means for supplying electric current alternately to said solenoids, a condenser in series with that solenoid which for the period is energized, and means for periodically reversing the current in the condenser, thereby causing reciprocation of the said armature.

2. In a system wherein there is an electric motor comprising a reciprocating armature, a solenoid actuating said armature to move in one direction, a second solenoid actuating said armature to move in the opposite direction, means for supplying electric current alternately to said solenoids, a condenser in series with that solenoid which for the period is energized, and means for periodically reversing the current in the condenser, thereby causing reciprocation of the said armature, the capacity of the condenser being so calculated that the time for half a period of the natural frequency of the circuits containing said solenoids and the condenser is substantially equal to the duration of the connection in said circuits of the periodically reversing means controlling the speed of said electric motor.

3. In a system wherein there is an electric motor comprising a reciprocating armature, a solenoid actuating said armature to move in one direction, a second solenoid actuating said armature to move in the opposite direction, means for supplying electric current alternately to said solenoids, a condenser in series with that solenoid which for the period is energized, and means for periodically reversing the current in the condenser, thereby causing reciprocation of the said armature, said periodically reversing means comprising a rotary contact drum, and contact brushes sliding thereon, and an electric motor for driving said drum.

4. In a system wherein there is an electric motor comprising a reciprocating armature, a solenoid actuating said armature to move in one direction, a second solenoid actuating said armature to move in the opposite direction, means for supplying electric current alternately to said solenoids, a condenser in series with that solenoid which for the period is energized, and means for periodically reversing the current in the condenser, thereby causing reciprocation of the said armature, the capacity of the condenser being so calculated that the time for half a period of the natural frequency of the circuits containing said solenoids and the condenser is substantially equal to the duration of the connection in said circuits of the periodically reversing means controlling the speed of said electric motor, said periodically reversing means comprising a rotary contact drum, and contact brushes sliding thereon, and an electric motor for driving said drum.

5. In a system wherein there is an electric motor comprising a reciprocating armature, a solenoid actuating said armature to move in one direction, a second solenoid actuating said armature to move in the opposite direction, means for supplying electric current alternately to said solenoids, a condenser in series with that solenoid which for the period is energized, and means for periodically reversing the current in the condenser, thereby causing reciprocation of the said armature, the reactance of one of said solenoids being greater than that of the other.

6. In a system wherein there is an electric motor comprising a reciprocating armature, a solenoid actuating said armature to move in one direction, a condenser in series with said solenoid, a second solenoid actuating said armature to move in the opposite direction, a second condenser in series with said second solenoid, and means for supplying electric current alternately to said solenoids and for periodically reversing the current in the condensers, thereby causing reciprocation of the said armature.

7. In a system wherein there is an electric motor comprising a reciprocating armature, a solenoid actuating said armature to move in one direction, a condenser in series with said solenoid, a second solenoid actuating said armature to move in the opposite direction, a second condenser in series with said second solenoid, and means for supplying electric current alternately to said solenoids and for periodically reversing the current in the condensers, thereby causing, reciprocation of the said armature, the reactance of one of said solenoids being greater than that of the other.

8. In a system wherein there is an electric motor comprising a reciprocating armature, a solenoid actuating said armature to move in one direction, a second solenoid actuating said armature to move in the opposite direction, means for supplying electric current alternately to said solenoids, a condenser in series with that solenoid which for the period is energized, and means for periodically reversing the current in the condenser, thereby causing reciprocation of the said armature, said periodically reversing means comprising a rotary contact drum having three contact segments, and five contact brushes sliding thereon, and an electric motor for driving said drum.

9. In a system wherein there is an electric motor comprising a reciprocating armature, a solenoid actuating said armature to move in one direction, a second solenoid actuating said armature to move in the opposite direction, means for supplying electric current alternately to said solenoids, a condenser in series with that solenoid which for the period is energized, and means for periodically reversing the current in the condenser, thereby causing reciprocation of the said armature, each solenoid comprising at least two separate coils, the coils of each solenoid cooperating in pairs.

10. In a system wherein there is an electric motor comprising a reciprocating armature, a solenoid actuating said armature to move in one direction, a second solenoid actuating said armature to move in the opposite direction, a condenser in series with that solenoid which for the period is energized, and means for alternately supplying electric current to one of said solenoids and for shunting said other solenoid by the condenser, thereby causing reciprocation of the said armature.

11. In a system wherein there is an electric motor comprising a reciprocating armature, a solenoid actuating said armature to move in one direction, a second solenoid actuating said armature to move in the opposite direction, a condenser in series with that solenoid which for the period is energized, and means for alternately supplying electric current to one of said solenoids and for shunting said other solenoid by the condenser, thereby causing reciprocation of the said armature, said means comprising a rotary contact drum having two contact segments, and three contact brushes sliding thereon, and an electric motor for driving said drum.

12. In a system for obtaining reciprocating movements, an aggregate comprising an electric motor consisting of a reciprocating armature, a solenoid actuating said armature to move in one direction and a second solenoid actuating said armature to move in the opposite direction, a source of current, a second aggregate separated from said first-mentioned aggregate and comprising a condenser and means for supplying electric current to said condenser and for periodically reversing the current in the condenser, the said means intermittently connecting first one and then the other solenoid in series with the said condenser.

In witness whereof, I hereunto subscribe my name this 24th day of March, 1928.

PER FRENELL.